United States Patent [19]

Ho

[11] Patent Number: 5,373,838
[45] Date of Patent: Dec. 20, 1994

[54] SOLAR HEATER ASSEMBLY

[76] Inventor: Hsi-Hsin Ho, 45, Lane 606, Sec. 2, Li Ming Rd., Taichung, Taiwan, Prov. of China

[21] Appl. No.: 89,133

[22] Filed: Jul. 8, 1993

[51] Int. Cl.$^5$ ................................................. F24J 3/02
[52] U.S. Cl. ..................................... 126/569; 126/663; 126/651; 126/906; 126/600
[58] Field of Search ............... 126/600, 658, 660, 661, 126/662–663, 696, 702, 906, 904, 701, 703, 655, 623; 138/109; 285/261, 264

[56] References Cited

U.S. PATENT DOCUMENTS

| | | | |
|---|---|---|---|
| 1,927,703 | 9/1933 | Glowacki | 362/421 |
| 3,278,203 | 10/1966 | Snyder | 285/160 |
| 4,144,931 | 3/1979 | Medico, Jr. | 165/485 |
| 4,191,165 | 3/1980 | Faudarole | 126/906 X |
| 4,527,548 | 7/1985 | Gustafson | 126/628 X |

Primary Examiner—Larry Jones

[57] ABSTRACT

A solar heater includes one or more conduits coupled between a pair of pipes, one or more extensions are formed on each of the pipes, each of the conduits has two ends rotatably engaged in the extensions of the pipes, and a heat collecting mechanism is fixed on each of the conduits and rotated in concert with the conduits such that the heat collecting mechanism can be rotated relative to the pipes in order to adjust the directions of the heat collecting mechanisms.

1 Claim, 9 Drawing Sheets

SOLAR HEATER ASSEMBLY

BACKGROUND OF THE INVENTION

1. Field of the Invention

The present invention relates to a solar heater, and more particularly to a solar heater assembly.

2. Description of the Prior Art

A typical solar heater comprises a housing 10 including a heat insulating plate 11 disposed therein, a plurality of pipes 12 including a pair of parallel pipes 122 and a number of pipes 121 coupled between the pipes 122, the pipes 121 and 122 being fixed together by welding processes, a heat collecting plate 13 disposed between the pipes 121 and the heat insulating plate 11, and a transparent cover 14 disposed on top of the housing 10; the pipes 121, 122 are solidly fixed together such that the solar heater includes a heavy weight and can not be easily moved.

As shown in FIGS. 2 and 3, the solar heaters B and C are supported on a frame D which is disposed on top of a building A, the solar heaters B and C are directed to a predetermined direction and the direction thereof can not be easily changed, such that the solar heaters can not be always directed toward the sun, the heating collecting effect is thus greatly decreased.

The present invention has arisen to mitigate and/or obviate the afore-described disadvantages of the conventional solar heaters.

SUMMARY OF THE INVENTION

The primary objective of the present invention is to provide a solar heater assembly in which the heat collecting plate can be rotated and directed toward the sun such that the heating collecting effect is greatly increased.

In accordance with one aspect of the invention, there is provided a solar heater assembly comprising a pair of pipes each including at least one extension formed thereon, at least one conduit coupled between the extensions of the pipes and including two ends, a ball fixed on each of the ends of the conduit and rotatably received in the respective extensions of the pipes, a cap engaged with each of the extensions for retaining the balls in place, and a heat collecting mechanism fixed on the conduit and rotated in concert with the conduit, whereby, the heat collecting mechanism is rotatable relative to the pipes by the balls.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 4A is a partial cross sectional view illustrating the coupling of the heat collecting plates to the housing;

DETAILED DESCRIPTION OF THE PREFERRED EMBODIMENT

Figure 1:
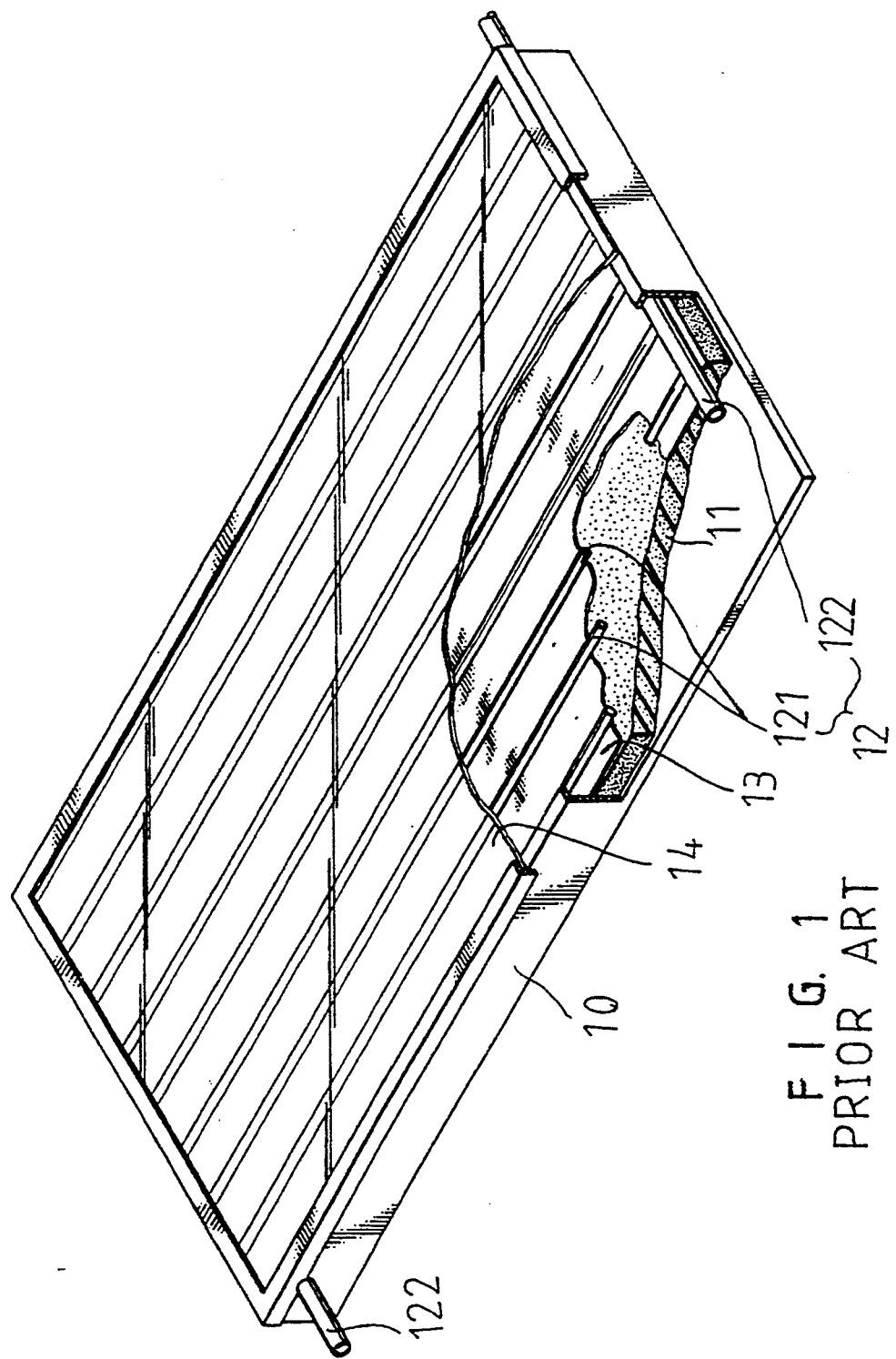
FIG. 1 is a perspective view of a heat collecting plate of a typical solar heater.
Figure 2:
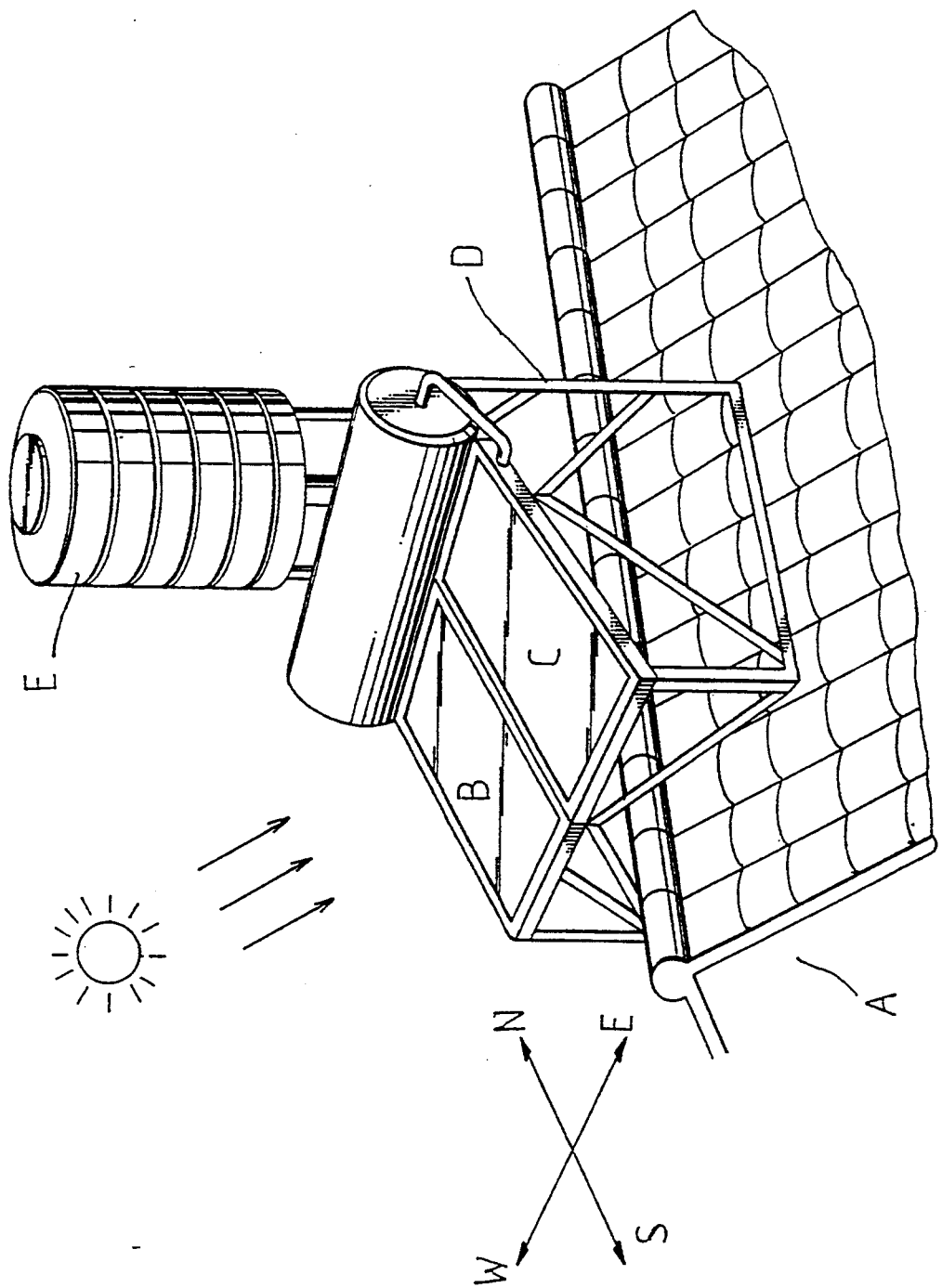
FIGS. 2 and 3 are schematic views illustrating the mounting of the typical solar heaters.
Figure 3:
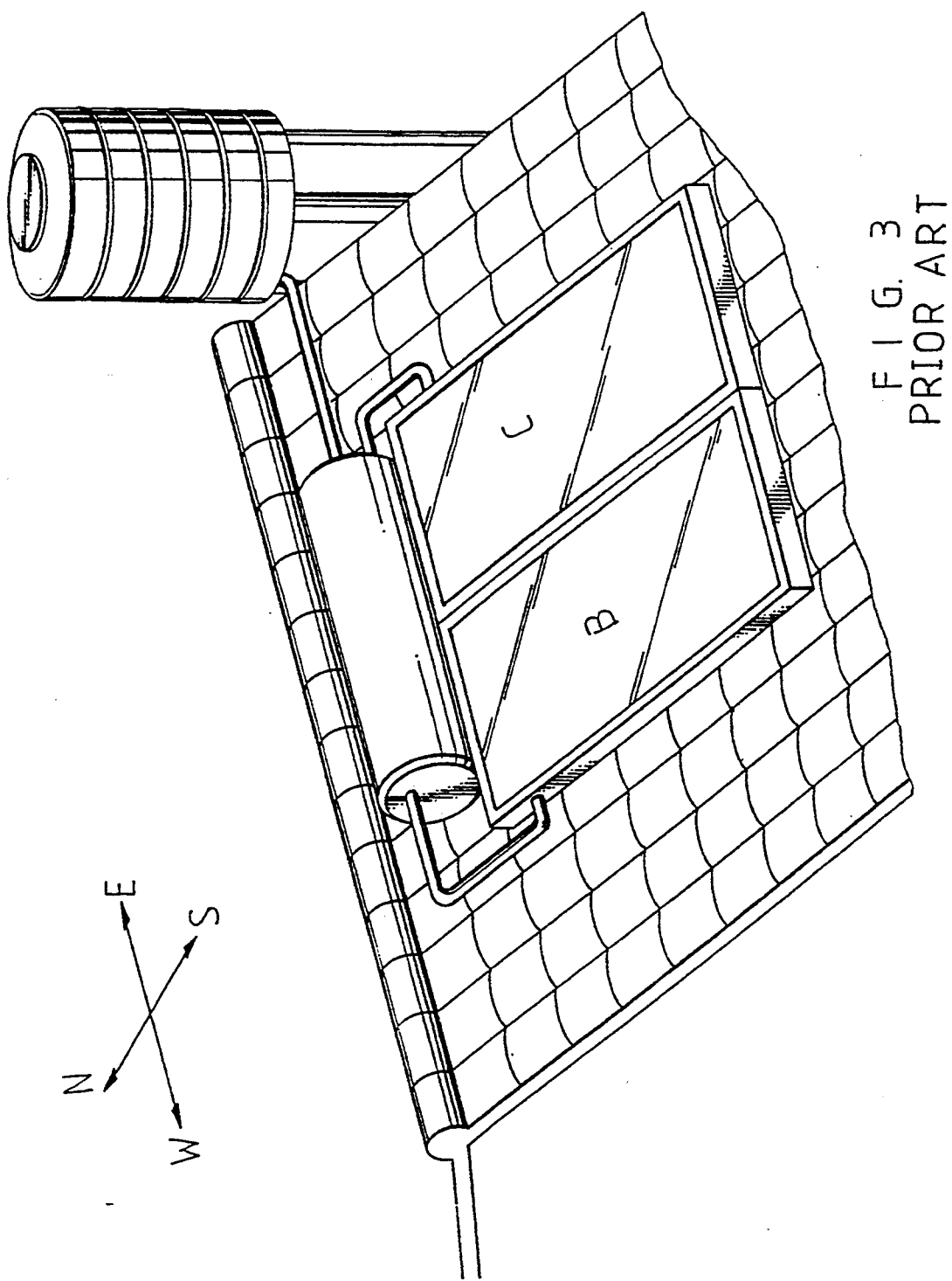
Figure 4:
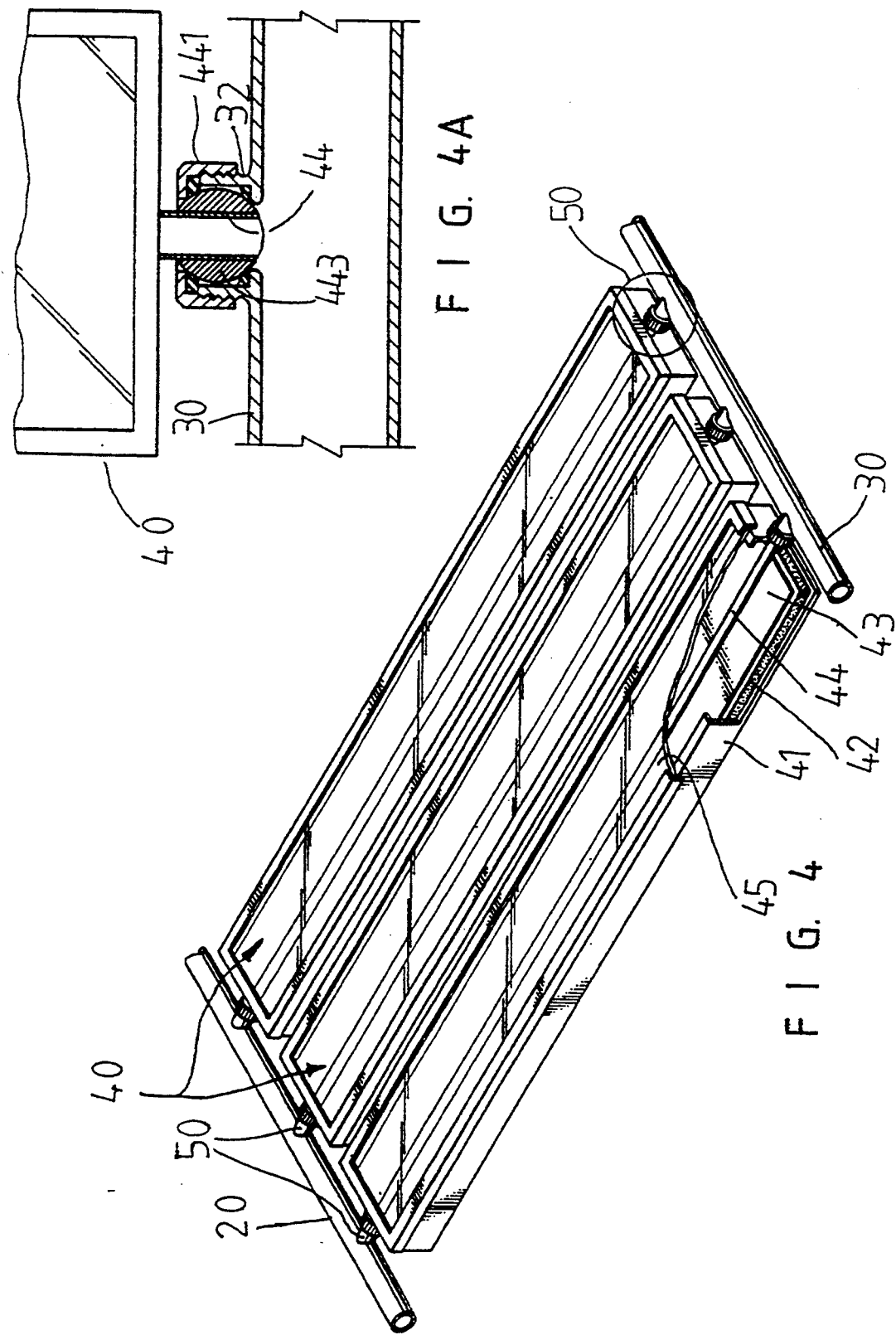
FIG. 4 is a perspective view of a heat collecting plates of a solar heater assembly in accordance with the present invention.
Figure 5:
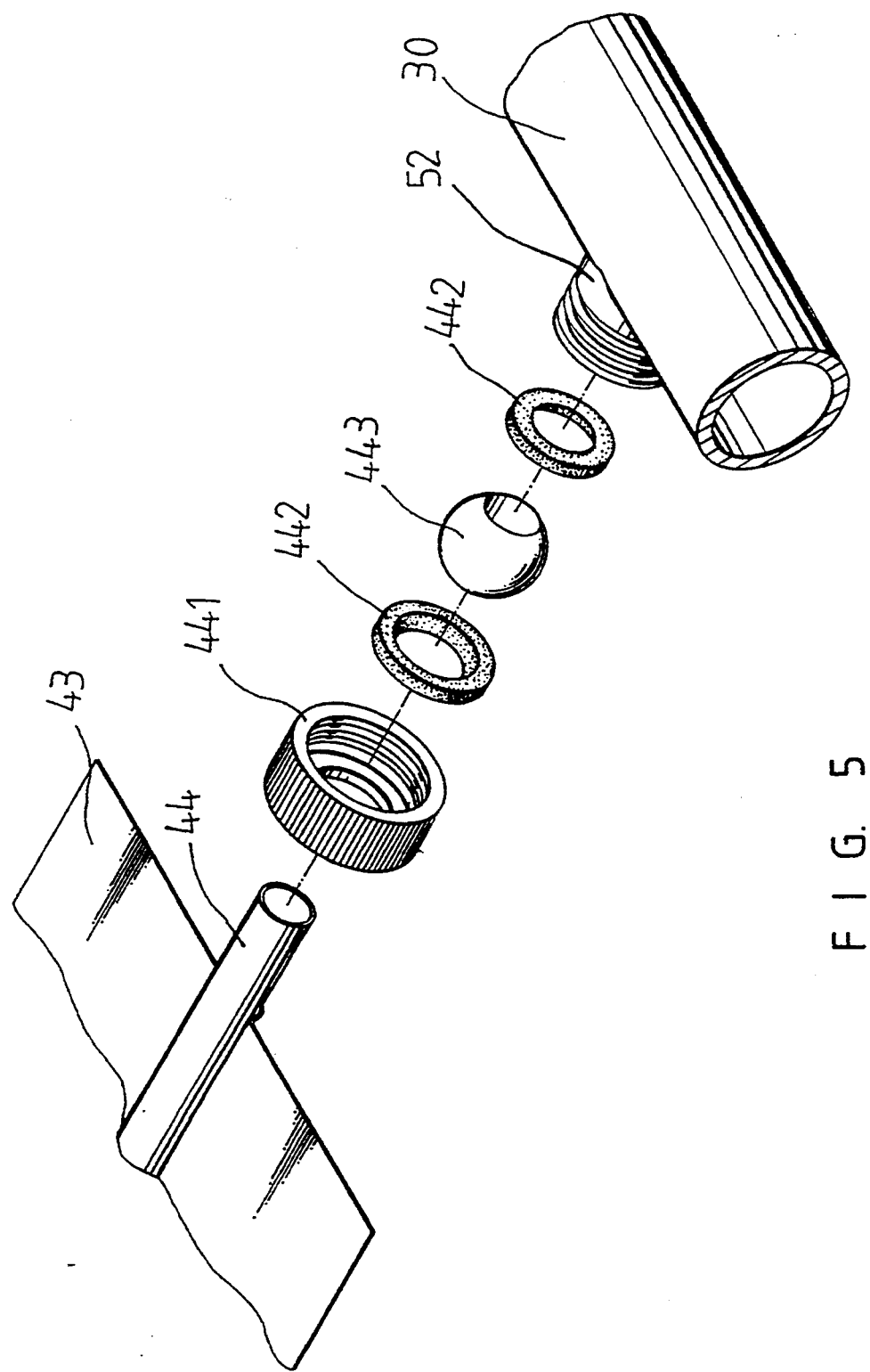
FIG. 5 is an exploded view of the couplings.

Referring to the drawings, and initially to FIGS. 4, 4A and 5, a solar heater assembly in accordance with the present invention comprises a pair of parallel pipes 20, 30, a plurality of conduits 44 rotatably coupled between the pipes 20, 30 by couplers 50, and a heat collecting mechanism 40 fixed on each of the conduits 44, each of the heat collecting mechanisms 40 includes a housing 41 fixed on each of the conduits 44, a heat insulating layer 42, a heating collecting plate 43, and a transparent cover 45 disposed on top thereof.

Figure 6:
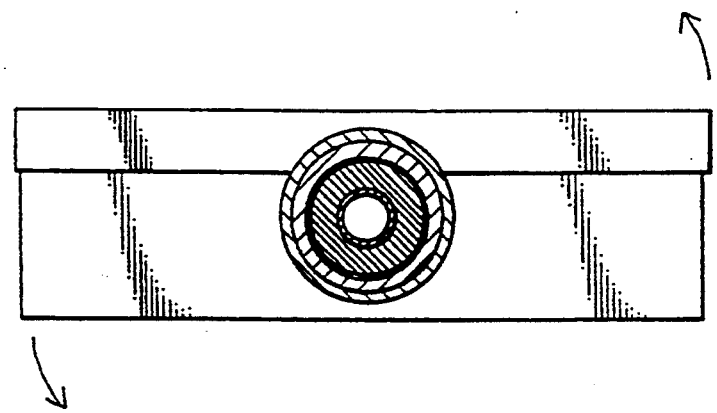
FIGS. 6 and 7 are partial cross sectional views illustrating the operation of the couplings.
Figure 7:
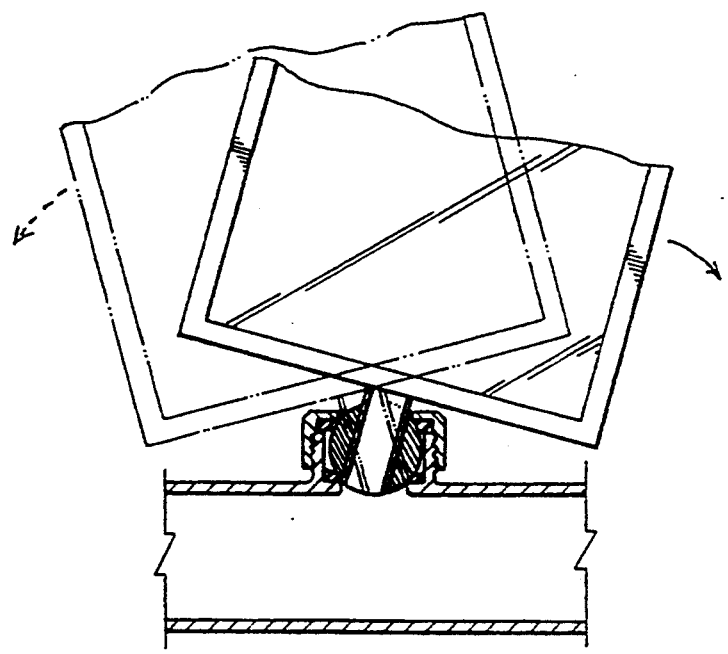

As best shown in FIG. 4A, and FIG. 5, each of the couplers 50 includes an extension 52 formed in either of the pipes 20, 30 and having an outer thread formed thereon, a ball 443 fixed on the end portion of each of the conduits 44 and rotatably received in the respective extensions 52, a pair of packings 442 engaged with each of the balls 443, and a cap 441 threaded with the outer thread of each of the extensions 52 such that the balls 443 are rotatably supported within the extensions 52 and such that the conduits 44 can be rotated relative to the pipes 20, 30 by the balls 443, best shown in FIGS. 6 and 7, the heat collecting mechanisms 40 can thus be rotated by the balls 443, the balls 443 can be fixed in place by the caps 441.

Figure 8:
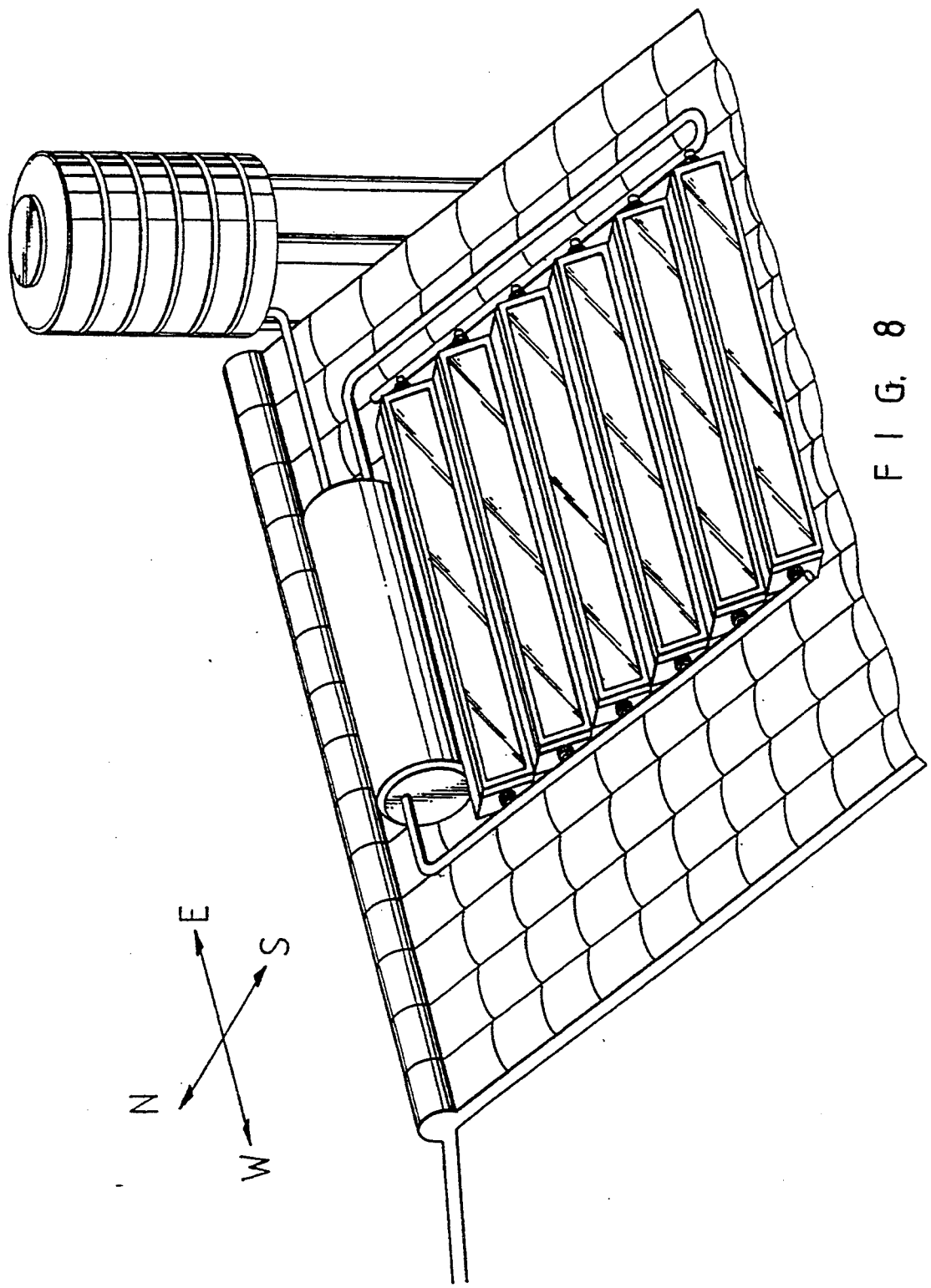
FIGS. 8, 9 and 10 are perspective views illustrating the operations of the solar heater assembly in accordance, with the present invention.
Figure 9:
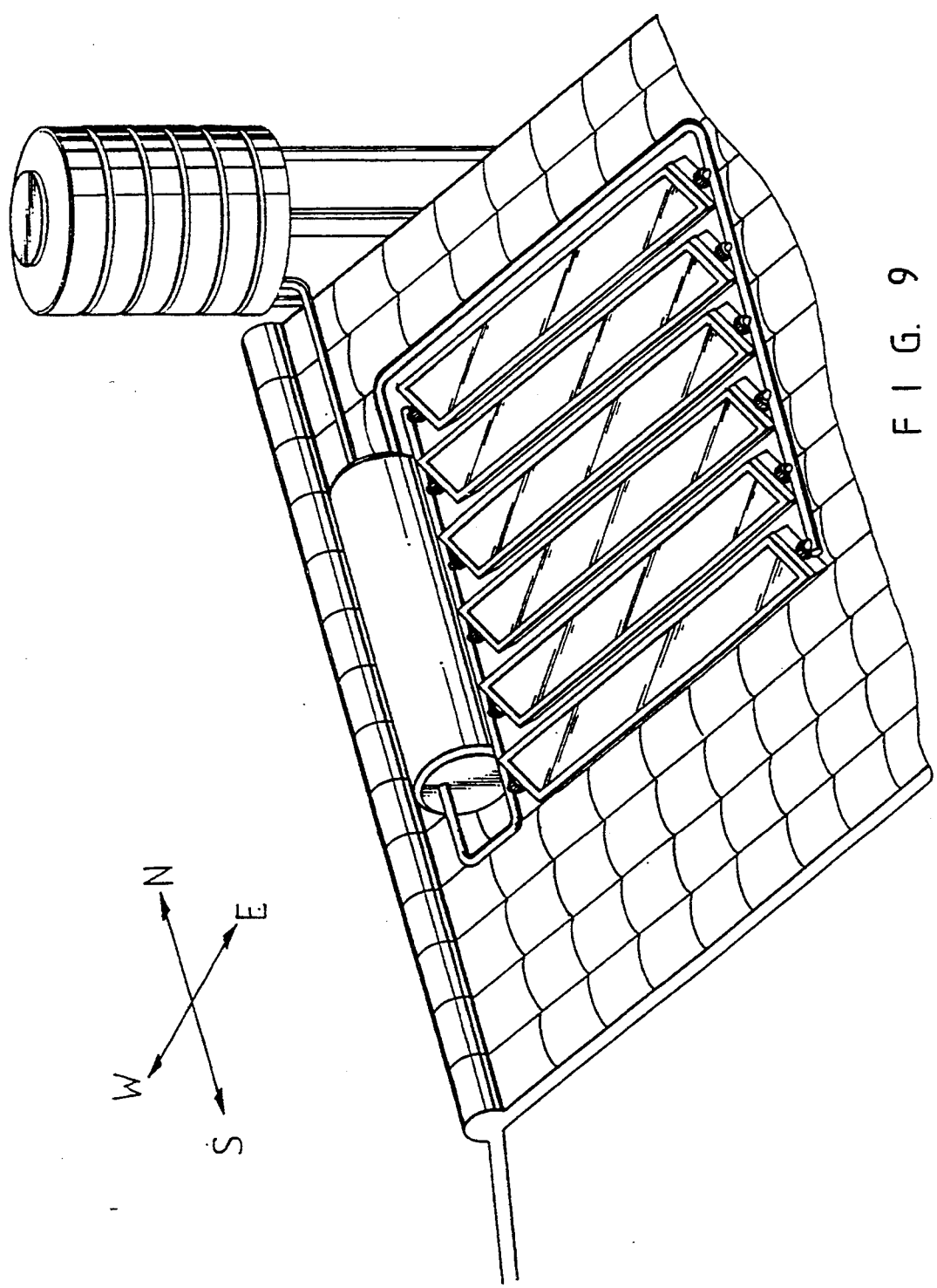
Figure 10:
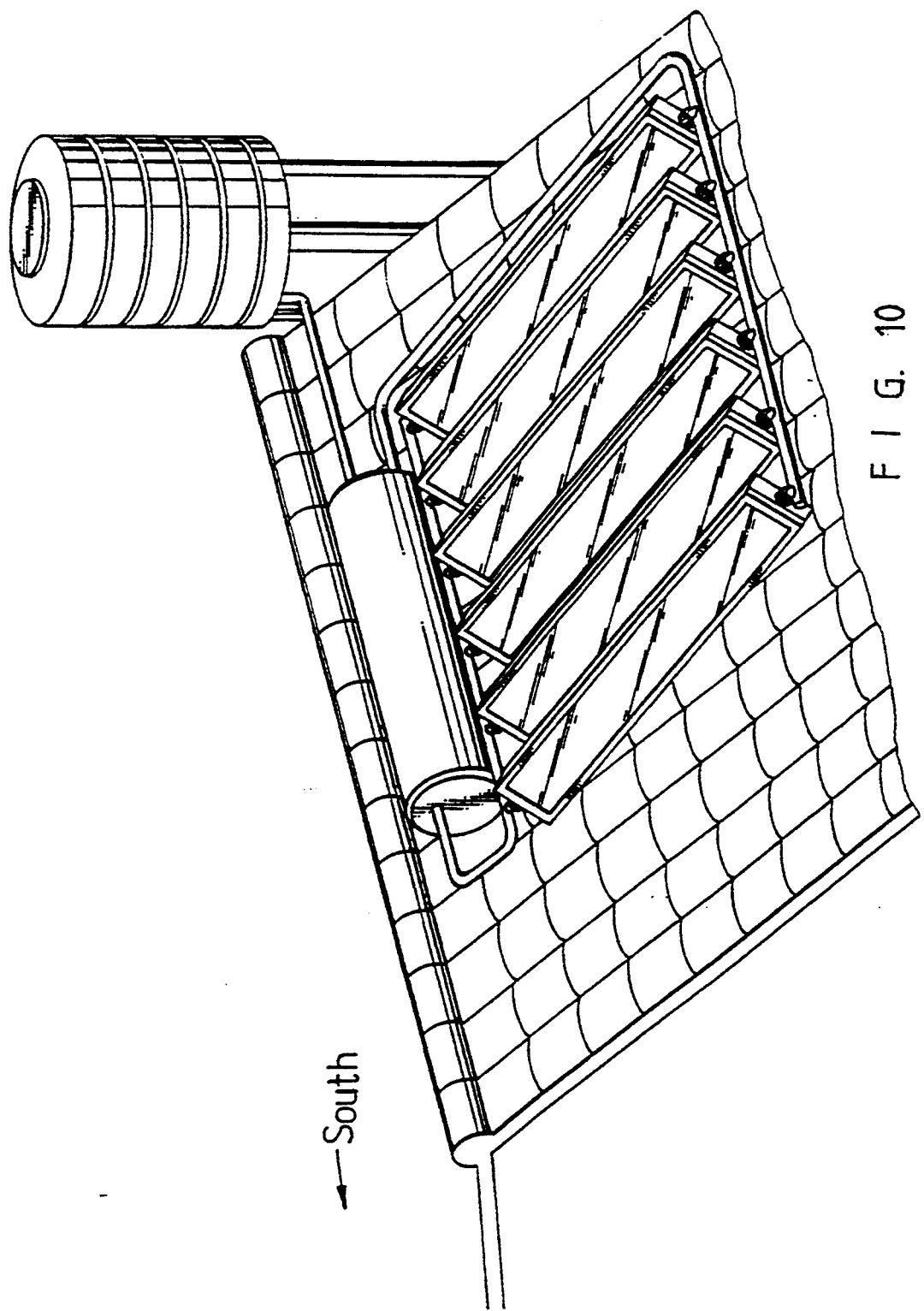

Referring next to FIGS. 8, 9 and 10, for the users in the north earth, it is preferable that the heat collecting mechanisms 40 are directed toward south. On the contrary, for the users in the south earth, it is preferable that the heat collecting mechanisms 40 are directed toward north.

As shown in FIGS. 7 and 10, the conduits 44 can also be adjusted relative to the pipes 20, 30 such that the conduits 44 are not perpendicular to the pipes.

Accordingly, the solar heater assembly in accordance with the present invention includes a heat collecting mechanism whose direction can be directed toward the desired directions such that the heat collecting effect can be greatly increased. In addition, the heat collecting mechanisms can be disengaged from the pipes 20, 30 such that the solar heater assembly can be easily transported.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A solar heater assembly comprising a pair of pipes each including at least one extension formed thereon, at least one conduit coupled between said extensions of said pipes and including two ends, a ball fixed on each of said ends of said conduit and rotatably received in the respective extensions of said pipes, a cap engaged with each of said extensions for retaining said balls in place, and a heat collecting mechanism fixed on said conduit and rotated in concert with said conduit, whereby, said heat collecting mechanism is freely rotatable relative to said pipes by said balls.

* * * * *